US012688737B1

(12) United States Patent
Nguyen et al.

(10) Patent No.: US 12,688,737 B1
(45) Date of Patent: Jul. 21, 2026

(54) CONTEXT-BASED VEHICLE IDLING DETECTION SYSTEM

(71) Applicant: Samsara Inc., San Francisco, CA (US)

(72) Inventors: Jennifer Nguyen, San Francisco, CA (US); Joe Downard, London (GB); Jonathan Rubstein, London (GB); Kenshiro Nakagawa, Burlingame, CA (US); Salil Gupta, Brooklyn, NY (US); Tina Quach, Cupertino, CA (US); Amanda Steinwedel, Edinburgh (GB); Andrii Sliusar, London (GB); Ethan Wood, London (GB); Grant Kalasky, San Francisco, CA (US); Robert Koenig, Edinburgh (GB); Sonam Dhawan, London (GB); Andrea Harpprecht, London (GB); Janice Cheng, Croydon (GB); Caglar Iskender, Redmond, WA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/217,375

(22) Filed: May 23, 2025

(51) Int. Cl.
| | |
|---|---|
| *G07C 5/00* | (2006.01) |
| *G06V 20/56* | (2022.01) |
| *G06V 20/59* | (2022.01) |
| *G07C 5/06* | (2006.01) |
| *G07C 5/08* | (2006.01) |
| *G06V 40/10* | (2022.01) |

(52) U.S. Cl.
CPC ............. *G07C 5/008* (2013.01); *G06V 20/56* (2022.01); *G06V 20/59* (2022.01); *G07C 5/06* (2013.01); *G07C 5/0825* (2013.01); *G06V 40/10* (2022.01)

(58) Field of Classification Search
CPC ........ G07C 5/008; G07C 5/06; G07C 5/0825; G06V 20/56; G06V 20/59; G06V 40/10
USPC ......................................................... 701/31.4
See application file for complete search history.

(56) References Cited

U.S. PATENT DOCUMENTS

| | | | | |
|---|---|---|---|---|
| 9,418,488 B1* | 8/2016 | Lambert | ................ | G07C 5/085 |
| 10,102,691 B1* | 10/2018 | Ghanbari | ............... | G07C 5/008 |
| 2015/0081399 A1* | 3/2015 | Mitchell | .................. | G08G 1/20 |
| | | | | 705/7.38 |
| 2018/0374364 A1* | 12/2018 | Kennedy | ................. | H04W 4/38 |
| 2019/0347513 A1* | 11/2019 | Salti | .................... | G06F 18/2431 |

* cited by examiner

*Primary Examiner* — Tyler D Paige
(74) *Attorney, Agent, or Firm* — Schwegman Lundberg & Woessner, P.A.

(57) ABSTRACT

A system and method for monitoring vehicle idling events using contextual information. Engine operational data from a vehicle is monitored to detect idling states. When a parameter of the idling state exceeds a threshold value, the system obtains contextual data associated with the vehicle including camera feeds, location data, and environmental conditions. The contextual data is analyzed to determine operational conditions during the idling event. Based on the analysis, the system categorizes the idling state and generates reports that include the categorization and operational conditions. The system enables real-time detection and analysis of idling events by incorporating multiple data streams to accurately determine whether idling events are productive or unproductive.

20 Claims, 10 Drawing Sheets

200

IDLE MONITORING SYSTEM
124

PROCESSORS
208

DATA COLLECTION MODULE 202

CONTEXT ANALYSIS MODULE 204

CLASSIFICATION MODULE 206

REPORTING MODULE 208

300

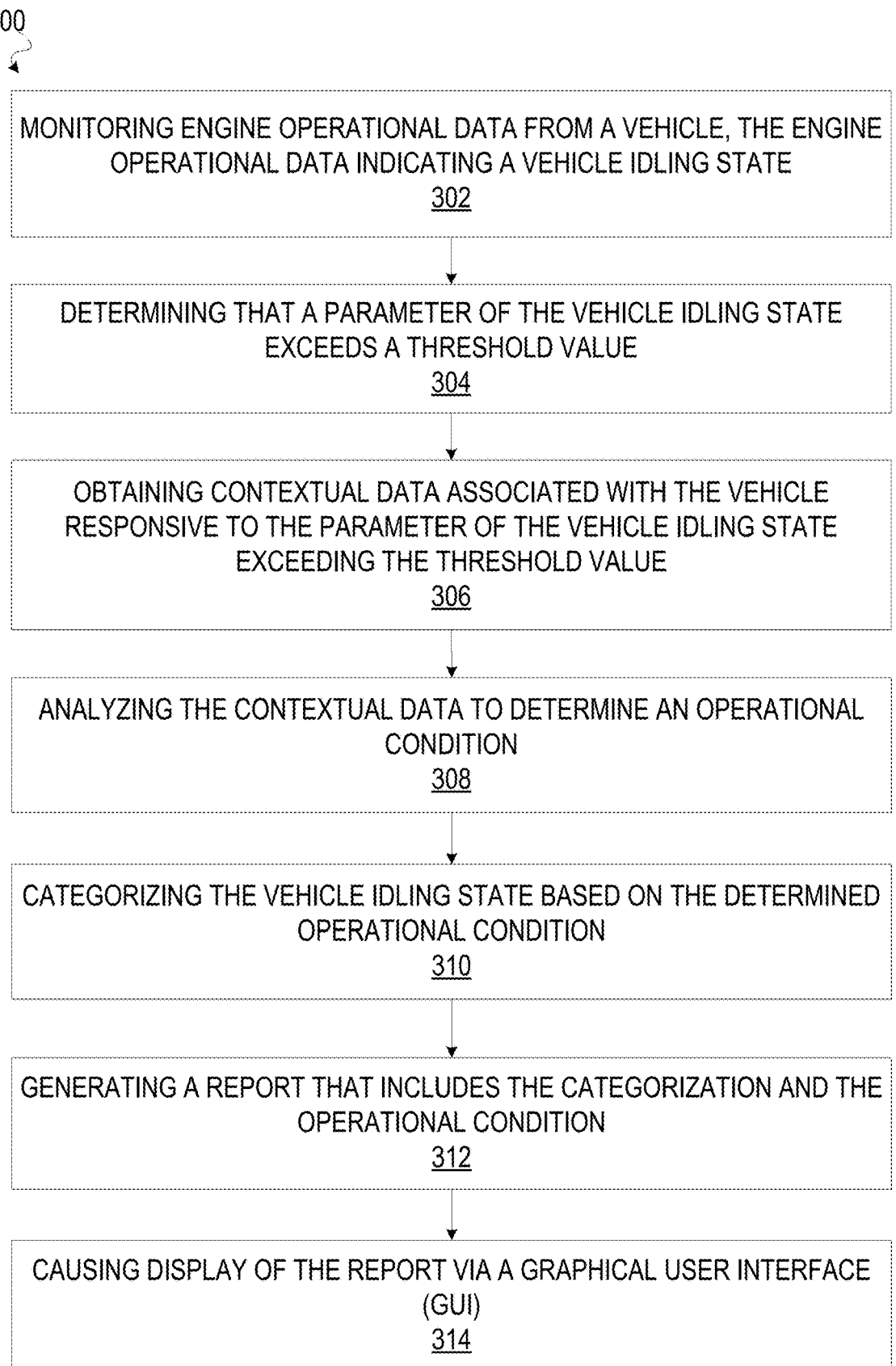

MONITORING ENGINE OPERATIONAL DATA FROM A VEHICLE, THE ENGINE OPERATIONAL DATA INDICATING A VEHICLE IDLING STATE
302

DETERMINING THAT A PARAMETER OF THE VEHICLE IDLING STATE EXCEEDS A THRESHOLD VALUE
304

OBTAINING CONTEXTUAL DATA ASSOCIATED WITH THE VEHICLE RESPONSIVE TO THE PARAMETER OF THE VEHICLE IDLING STATE EXCEEDING THE THRESHOLD VALUE
306

ANALYZING THE CONTEXTUAL DATA TO DETERMINE AN OPERATIONAL CONDITION
308

CATEGORIZING THE VEHICLE IDLING STATE BASED ON THE DETERMINED OPERATIONAL CONDITION
310

GENERATING A REPORT THAT INCLUDES THE CATEGORIZATION AND THE OPERATIONAL CONDITION
312

CAUSING DISPLAY OF THE REPORT VIA A GRAPHICAL USER INTERFACE (GUI)
314

FIG. 3

400
CAPTURING IMAGE DATA FROM AT LEAST ONE CAMERA MOUNTED AT THE VEHICLE
402
ANALYZING THE IMAGE DATA TO DETERMINE THE OPERATIONAL CONDITION
404
*FIG. 4*

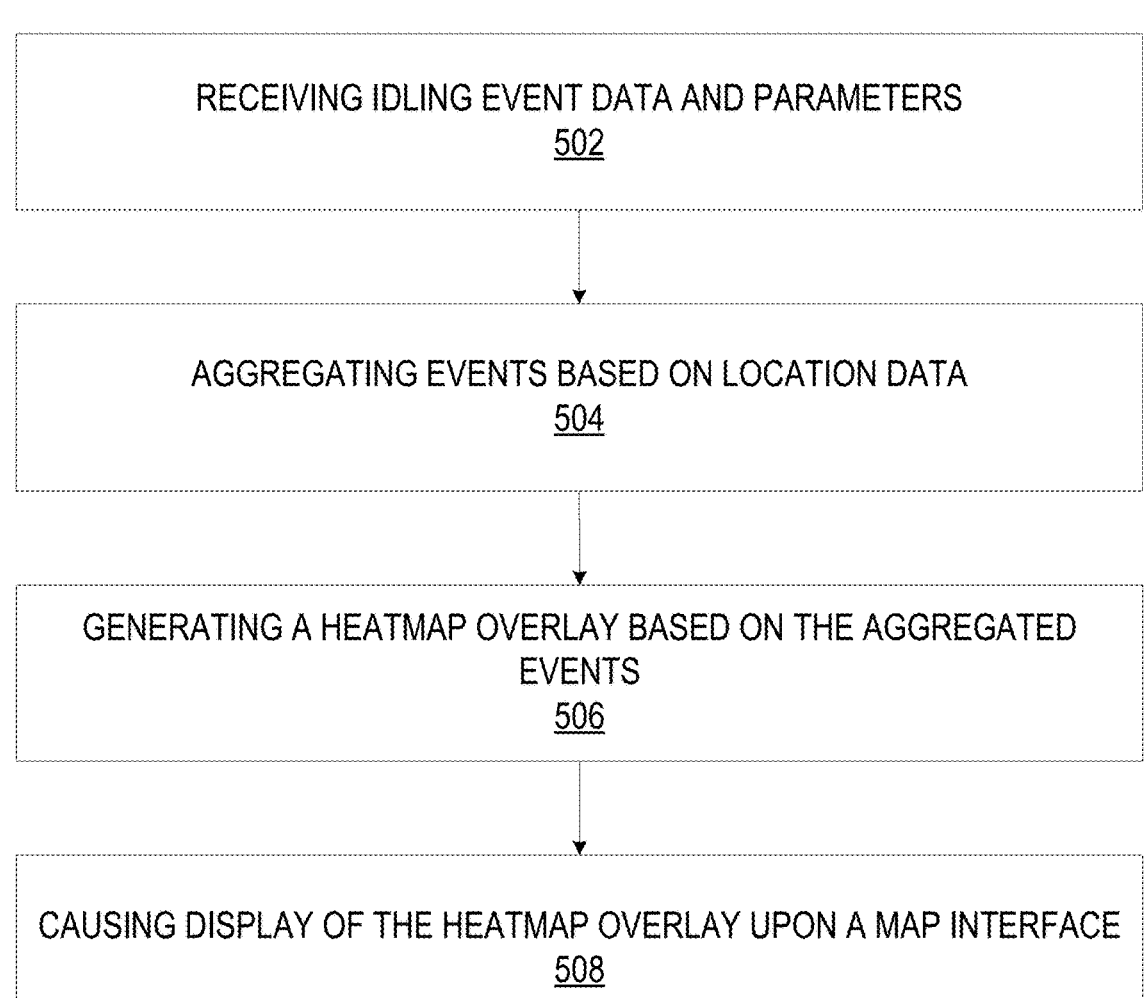
RECEIVING IDLING EVENT DATA AND PARAMETERS
502
AGGREGATING EVENTS BASED ON LOCATION DATA
504
GENERATING A HEATMAP OVERLAY BASED ON THE AGGREGATED EVENTS
506
CAUSING DISPLAY OF THE HEATMAP OVERLAY UPON A MAP INTERFACE
508
*FIG. 5*

CONTEXT-BASED VEHICLE IDLING DETECTION SYSTEM

TECHNICAL FIELD

Embodiments of the present disclosure relate generally to vehicle monitoring systems and telematics, and more particularly to systems and methods for analyzing vehicle operational data. The field includes vehicle data collection systems that process and analyze engine operational parameters, environmental conditions, and situational context to evaluate vehicle usage patterns.

BACKGROUND

Vehicle monitoring systems have traditionally relied on pre-computed engine operational data alone to detect and analyze vehicle idling events, introducing substantial processing delays of up to three days. These challenges are compounded by processing 5-10 million events per month for large organizations, requiring sophisticated data clustering and analysis capabilities. These conventional systems face significant technical challenges in accurately determining the nature and context of idling events due to their reliance solely on delayed engine data processing.

Current vehicle monitoring technologies struggle with the technical challenge of differentiating between necessary and unnecessary idling events due to their limited data collection scope. Engine-based detection systems cannot independently determine whether a vehicle is idling due to traffic conditions, maintenance requirements, or other legitimate operational needs. This technical limitation often results in false positive detections when vehicles are operating within normal parameters.

Furthermore, existing systems face significant technical hurdles in processing and analyzing multiple data streams in real-time. The delay between data collection and analysis prevents fleet operators from receiving timely information about vehicle states and operational patterns. This technical constraint has historically limited the ability to implement effective real-time monitoring and automated response systems.

The technical complexity is further compounded by environmental and operational variables that affect vehicle idling patterns. Current systems lack the technical capability to incorporate contextual information such as temperature conditions, location-specific parameters, and operational circumstances into their analysis frameworks. These technical limitations result in incomplete or potentially misleading data about vehicle operational states.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flowchart depicting a method of monitoring and analyzing vehicle idling events performed by the idle monitoring system and its component modules, according to certain examples.

FIG. 4 is a flowchart depicting a method of analyzing image data to determine operational conditions during vehicle idling events, according to certain examples.

FIG. 5 is a flowchart depicting a method of generating and displaying heatmap visualizations for idling events, according to certain examples.

DETAILED DESCRIPTION

Figure 1:
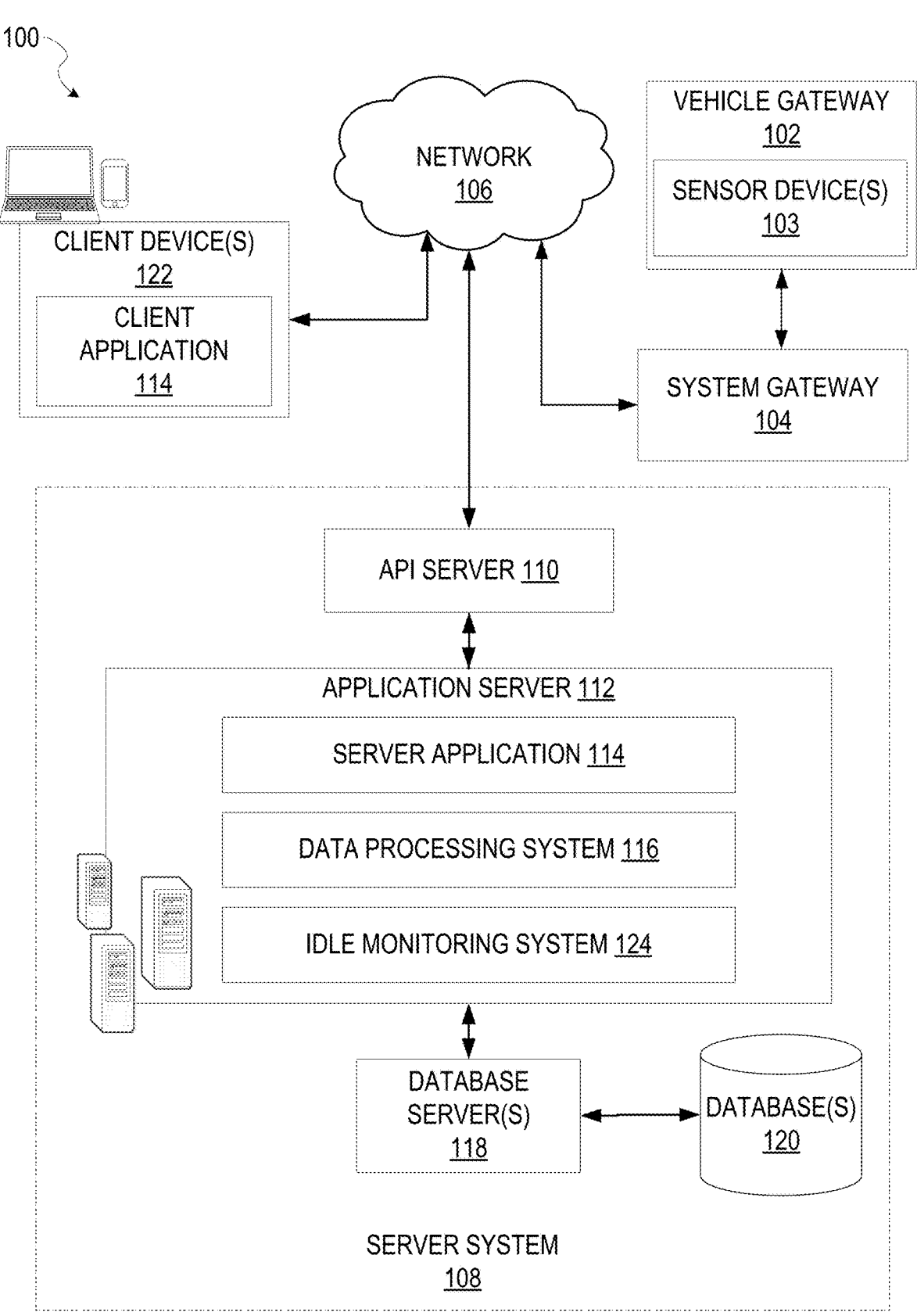
FIG. 1 is a block diagram showing an example system for monitoring vehicle idling states, according to certain examples.

Conventional vehicle monitoring systems face significant technical limitations in accurately analyzing idling events due to their reliance solely on engine operational data. These systems cannot differentiate between necessary and unnecessary idling since they lack contextual awareness of the circumstances surrounding each event.

The technical challenge is compounded by processing delays of up to three days in existing systems, preventing real-time detection and response. Additionally, current systems lack the technical capability to incorporate environmental factors and operational conditions that impact vehicle idling patterns.

Without the ability to process multiple data streams simultaneously and analyze contextual information in real-time, fleet operators receive incomplete or potentially misleading data about vehicle operational states. This technical limitation has historically prevented effective categorization of idling events and timely response to inefficient vehicle operation.

The present invention addresses these technical challenges by providing a system that combines engine operational data with real-time contextual information to enable accurate detection and categorization of vehicle idling events. In certain examples, the system creates idling events as they occur, enabling real-time monitoring and response. This immediate processing allows for extensive data enrichment and analysis that wasn't possible with previous delayed processing approaches.

According to certain examples, systems and methods are provided for detecting and analyzing vehicle idling events using contextual information. The system monitors engine operational data from a vehicle to detect idling states based on engine parameters. When a parameter of the idling state exceeds a threshold value, the system obtains contextual data associated with the vehicle to determine the nature and circumstances of the idling event.

The contextual data may be obtained from various sources including cameras mounted on the vehicle that can capture both interior cab conditions and external traffic conditions. The system analyzes image data to determine driver presence and surrounding traffic conditions that may affect the idling state. In some examples, the system generates heat map visualizations that overlay aggregated idling data on fleet overview maps.

The system may also obtain location data to determine whether the vehicle is idling in specific zone types such as yards, highways, or city streets. In some examples, environmental data such as temperature readings may be collected to evaluate whether climate control operation is warranted. The system may also consider PTO (Power Take-Off) status when evaluating idling events, with separate handling for PTO-related and non-PTO idling.

Using machine learning and image processing techniques, the system analyzes the collected contextual data to determine operational conditions during the idling event. Based on this analysis, the system categorizes the idling state as either productive or unproductive according to customizable rules. For example, the system may implement configurable unproductive idling rules that consider factors including minimum duration thresholds, temperature ranges for climate control, and PTO status. These rules can be customized based on specific operational requirements and environmental conditions.

In some examples, the system may integrate with a new driver assignment service that tracks the assigned driver at the time of each idling event. This real-time driver tracking enables more accurate attribution of idling events and will eventually synchronize with fuel and energy reporting systems to provide comprehensive driver behavior analysis.

The system generates comprehensive reports that include visualizations of idling events categorized by location, breakdowns of productive versus unproductive idling time, and associated contextual information. These reports are displayed via a user interface to provide fleet operators with actionable insights.

Real-time alerts may be generated when unproductive idling is detected, enabling immediate response to inefficient vehicle operation. The alerts can be transmitted directly to devices in the vehicle to notify drivers.

Conventional vehicle monitoring systems face significant technical limitations in accurately analyzing idling events due to their reliance solely on engine operational data. These systems cannot differentiate between necessary and unnecessary idling since they lack contextual awareness of the circumstances surrounding each event.

The technical challenge is compounded by processing delays of up to three days in existing systems, preventing real-time detection and response. Additionally, current systems lack the technical capability to incorporate environmental factors and operational conditions that impact vehicle idling patterns.

Without the ability to process multiple data streams simultaneously and analyze contextual information in real-time, fleet operators receive incomplete or potentially misleading data about vehicle operational states. This technical limitation has historically prevented effective categorization of idling events and timely response to inefficient vehicle operation.

The present invention addresses these technical challenges by providing a system that combines engine operational data with real-time contextual information to enable accurate detection and categorization of vehicle idling events.

FIG. 1 is a block diagram showing an example system 100 for monitoring vehicle idling states, according to certain examples. The system 100 includes a vehicle gateway 102 with sensor devices 103, client devices 122 that host client applications 114, and a server system 108 connected via a network 106.

The client applications 114 communicate and exchange data with the server system 108 via the network 106. The data exchanged includes vehicle operational data, contextual information, and idling event reports generated by the idle monitoring system 124.

The server system 108 provides server-side functionality via the network 106 to client applications 114 and to the vehicle gateway 102 and system gateway 104. While certain functions are described as being performed by specific components, the location of functionality between client applications 114, vehicle gateway 102, system gateway 104, or server system 108 may be adjusted based on processing requirements and technical considerations.

The server system 108 supports various monitoring and analysis operations. Such operations include collecting and processing engine operational data, contextual data, and generating idling event reports. The vehicle gateway 102 includes sensor devices 103 configured to collect engine operational data indicating vehicle idling states. Data exchanges within the system 100 are controlled through graphical user interfaces (GUIs) of the client applications 114.

The server system 108 includes an Application Program Interface (API) server 110 coupled to an application server 112. The application server 112 connects to a database server 118, which facilitates access to databases 120 storing vehicle operational data, contextual information, and idling event classifications processed by the application server 112.

The API server 110 receives and transmits data between client devices 122 and the application server 112. The API server 110 provides interfaces that can be called by client applications 114 to invoke functionality of the application server 112, including data transmission and idle monitoring functions.

The application server 112 hosts several applications and subsystems, including a server application 114 and an idle monitoring system 124. The idle monitoring system 124 is configured to monitor vehicle operational data, collect contextual information, analyze idling events, and generate reports with categorizations based on operational conditions. Further details of the idle monitoring system 124 can be found in FIG. 2.

The server application 114 implements data processing technologies related to processing engine operational data and contextual information from sensor devices 103. The data is analyzed to detect and categorize vehicle idling states before being stored in the database 120.

The application server 112 connects to the database server 118, which facilitates access to databases 120 storing vehicle operational data, contextual information, idling event classifications, and associated reporting data.

Figure 2:
FIG. 2 is a is a block diagram illustrating components of the idle monitoring system that configure the system to perform operations for monitoring and analyzing vehicle idling events, according to certain examples.

FIG. 2 is a block diagram 200 illustrating components of the idle monitoring system 124 that configure the system to perform operations for monitoring and analyzing vehicle idling events, according to certain examples. The idle monitoring system 124 includes multiple modules configured to perform specialized functions related to processing engine operational data and contextual information.

The data collection module 202 is configured to receive engine operational data from a vehicle and analyze it to detect idling states. The module interfaces with multiple vehicle sensors and data sources to monitor key operational parameters. Through the vehicle gateway 102 and sensor devices 103, it collects engine operational data including engine RPM values, run time duration, throttle position percentage, and engine load measurements from the engine control unit. The module also processes vehicle status information such as vehicle speed from speedometer sensors, transmission position, brake pedal status, and fuel consumption rates to establish baseline vehicle states. Additionally, it receives environmental sensor data including temperature readings for monitoring climate conditions, GPS location data for zone identification, and video feeds from camera systems that capture both interior cab conditions and external traffic situations. By continuously monitoring this comprehensive sensor data, the module can detect vehicle idling states by identifying specific parameter combinations-such as when the engine is running with non-zero RPM while the vehicle maintains zero speed with minimal throttle input. This multi-sensor monitoring approach enables accurate and reliable detection of idling conditions before triggering the collection and analysis of additional contextual information through other system modules.

The context analysis module 204 obtains contextual data when idling parameters exceed threshold values. This module processes data from vehicle cameras, location systems, and environmental sensors to determine operational conditions during idling events. The contextual analysis helps provide comprehensive understanding of each idling event's circumstances.

The classification module 206 analyzes the processed contextual data to categorize idling events as productive or unproductive based on customizable rules. When multiple factors are present, this module evaluates the overall context to determine appropriate classification of the idling event.

The reporting module 208 generates visualizations and reports that include idling event categorizations, contextual information, and operational conditions. This module can analyze patterns to identify trends, generate alerts for unproductive idling, and provide actionable insights through the user interface.

The processors 208 execute instructions to implement the functionality of the various modules described above. The processors coordinate the flow of data between modules and manage system resources to ensure efficient operation of the idle monitoring system 124. The processors also handle communication with vehicle systems and user interfaces for collecting data, processing information, and delivering reports.

FIG. 3 is a flowchart 300 depicting a method of monitoring and analyzing vehicle idling events performed by the idle monitoring system 124 and its component modules, according to certain examples. The method includes operations for detecting idling states, collecting contextual data, and generating reports based on operational conditions.

At operation 302, the data collection module 202 monitors engine operational data from a vehicle, where the engine operational data indicates a vehicle idling state. The operational data includes engine parameters such as RPM values, vehicle speed, and throttle position that indicate when a vehicle is idling.

At operation 304, the data collection module 202 determines that a parameter of the vehicle idling state exceeds a threshold value. This may involve monitoring the duration of the idling state or other operational parameters that indicate sustained idling conditions.

At operation 306, the context analysis module 204 obtains contextual data associated with the vehicle responsive to the parameter exceeding the threshold value. The contextual data may include image data from vehicle cameras, location information, and environmental conditions that provide context for the idling event.

At operation 308, the context analysis module 204 analyzes the contextual data to determine an operational condition. This analysis may involve processing camera feeds to detect driver presence or traffic conditions, evaluating location data to identify zone types, or assessing environmental factors like temperature.

At operation 310, the classification module 206 categorizes the vehicle idling state based on the determined operational condition. The module classifies the idling event as productive or unproductive based on the analyzed contextual information and customizable rules.

At operation 312, the reporting module 208 generates a report that includes the categorization and the operational condition. The report provides visualizations of idling events categorized by location, breakdowns of productive versus unproductive idling time, and associated contextual information.

At operation 314, the reporting module 208 causes display of the report via a graphical user interface (GUI), such as a GUI of a client device 122. The module presents the analyzed data and insights to users through client applications, enabling informed decision-making about vehicle operations.

FIG. 4 is a flowchart 400 depicting a method of analyzing image data to determine operational conditions during vehicle idling events, according to certain examples. The method includes operations for capturing and processing camera data to provide additional contextual information about idling states. The context analysis module 204 captures image data from at least one camera mounted at the vehicle, including both inward-facing cameras to monitor the vehicle cab and outward-facing cameras to observe traffic conditions and surrounding environment.

At operation 402, the context analysis module 204 processes the captured image data using various analysis techniques to determine operational conditions. This includes analyzing interior camera feeds to detect driver presence in the vehicle cab, processing external camera data to identify surrounding traffic conditions, and applying machine learning algorithms to identify environmental factors that may affect the idling state.

In some examples, based on the analysis of the captured image data, the system may initiate several follow-up measures through the reporting module 208. When the context analysis module 204 determines that a vehicle is experiencing unproductive idling—such as when the cab is empty or the vehicle is not in traffic—the system can generate and transmit immediate alerts to appropriate parties.

For drivers, in some examples the system can display real-time notifications through the client application 114 on client devices 122 located in the vehicle cab. These in-cab alerts can notify drivers to turn off their engines when unproductive idling is detected. The timing and conditions for these alerts can be customized based on specific operational rules and environmental conditions.

For fleet managers, drivers, and dispatchers, in some examples the system can generate separate notifications through their client applications 114, providing real-time visibility into idling events across their fleet. These notifications can include detailed contextual information such as location, duration, environmental conditions, and the detected operational state that triggered the alert. For example, manager notifications may include detailed contextual information such as location, duration, environmental conditions, and the detected operational state that triggered the alert, while dispatcher and driver notifications may include only a subset of the contextual information.

In some examples, when unproductive idling is detected and verified through image analysis-particularly when the cab is confirmed to be empty—the system could be configured to automatically initiate engine shutdown procedures through the vehicle gateway 102. However, such automated control would be subject to appropriate safety protocols and customizable rules to ensure it occurs only under suitable conditions.

FIG. 5 is a flowchart depicting a method 500 of generating and displaying heatmap visualizations for idling events, according to certain examples.

At operation 502, the system receives idling event data and parameters from vehicles through multiple sensor devices and data collection mechanisms. The data collection module interfaces with multiple vehicle sensors and data sources to monitor operational parameters. The system may also process vehicle status information such as vehicle speed from speedometer sensors, transmission position, brake pedal status, and fuel consumption rates to establish baseline vehicle states. Additionally, in some examples the system may receive environmental sensor data including temperature readings for monitoring climate conditions, GPS location data for zone identification, and video feeds from camera systems that capture both interior cab conditions and external traffic situations.

At operation 504, the system aggregates the received idling events based on location data using clustering algorithms. The clustering process groups proximate events to enable efficient visualization while maintaining data granularity across different map scales. For each cluster, the system calculates aggregate metrics including total idling duration, fuel consumption, and device counts.

At operation 506, the system generates a heatmap overlay based on the aggregated events. The system processes the event data to determine relative concentrations of idling activity across different geographical areas. Visual intensity indicators are assigned to represent idling event density, with darker shading indicating areas of higher idling concentration. The system generates map visualization data optimized for dynamic display and updates, enabling efficient rendering of the heatmap overlay at different zoom levels and viewport configurations.

At operation 508, the system causes display of the heatmap overlay on an interactive map interface of a client device, wherein the interface enables filtering and refinement of the displayed data through multiple parameters including date range selectors, tag filters, attribute selectors, air temperature ranges, driver identifiers, vehicle identifiers, geofence locations, idle event duration, and PTO status. The filtered visualization updates dynamically based on user-selected parameters to show relevant idling patterns.

Figure 6:
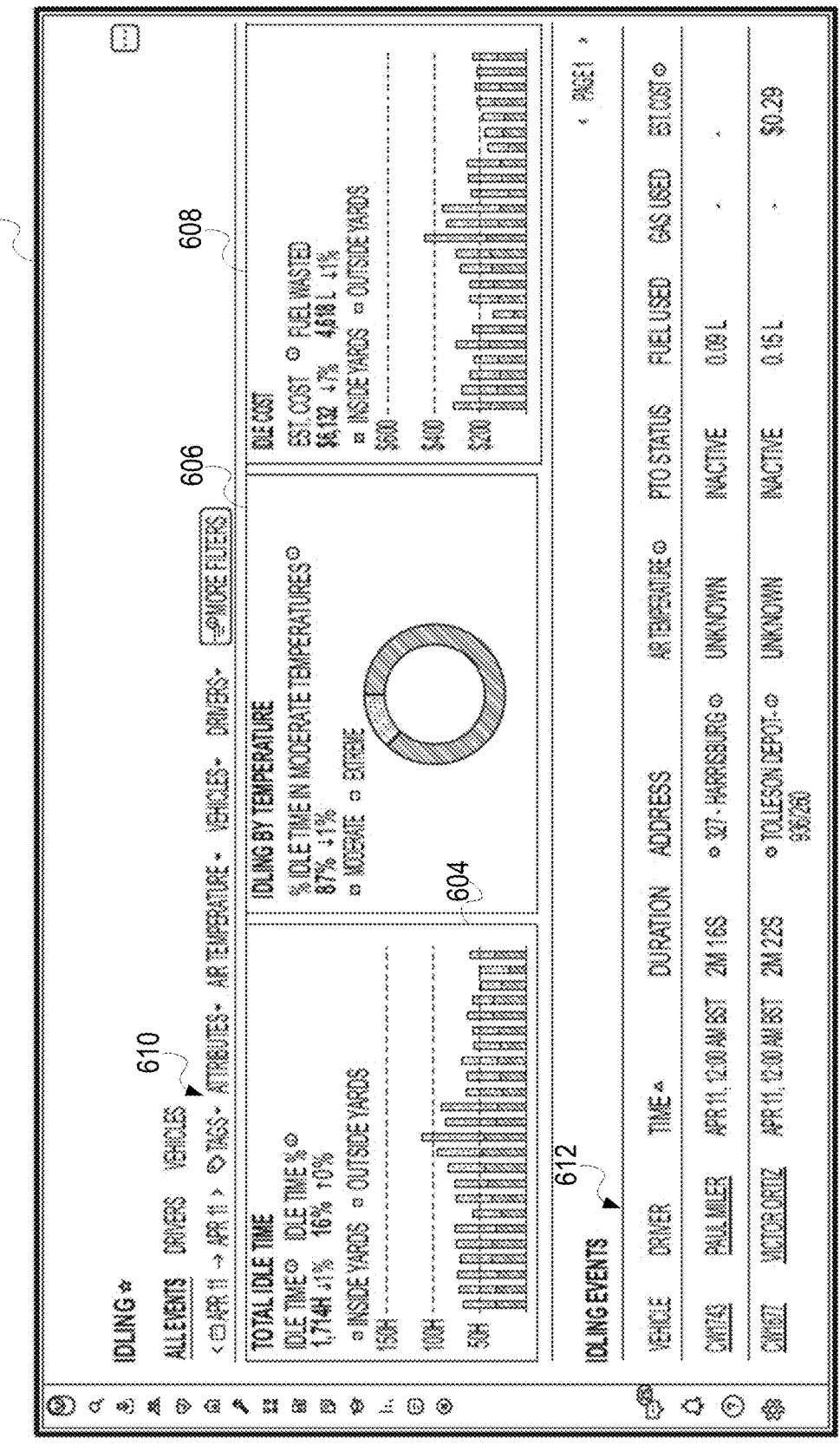
FIG. 6 is an interface diagram depicting a graphical user interface (GUI) for displaying and analyzing vehicle idling events, according to certain examples.

FIG. 6 is an interface diagram 600 depicting a graphical user interface 602 for displaying and analyzing vehicle idling events, according to certain examples. The interface 602 includes multiple visualization components and data presentation elements (i.e., the visualizations 604, 606, and 608) that enable users to monitor and analyze idling patterns across their fleet. As seen in the interface diagram 600, the interface 602 includes a header section with filtering controls 610 that allow users to refine the displayed data, including date range selectors, tag filters, attribute selectors, air temperature range controls, and dropdown menus for selecting specific vehicles and drivers. This filtering capability enables users to focus their analysis on specific operational parameters or fleet segments.

The interface 602 presents critical operational metrics through a "Total Idle Time" section (the visualization 604), displaying aggregate idle time measurements (1,714 h) and idle time percentage (16%). These metrics provide high-level insights into fleet idling patterns, complemented by a bar graph visualization 608 that compares idling time between "Inside Yards" and "Outside Yards" locations.

An event table 612 within the interface presents detailed information about individual idling events, including vehicle identifier, driver name, time stamp, duration of idling event, location address, air temperature readings, and Power Take-Off (PTO) status. This granular data presentation enables detailed analysis of specific idling incidents and facilitates the identification of patterns in driver behavior or location-based trends. The interface 602 also features a temperature analysis section (the visualization 606) with a pie chart breaking down idling events by temperature ranges, showing the percentage of idling time occurring in moderate versus extreme temperatures (87% in moderate temperatures). This visualization 606 helps operators understand the relationship between environmental conditions and idling behavior.

Figure 7:
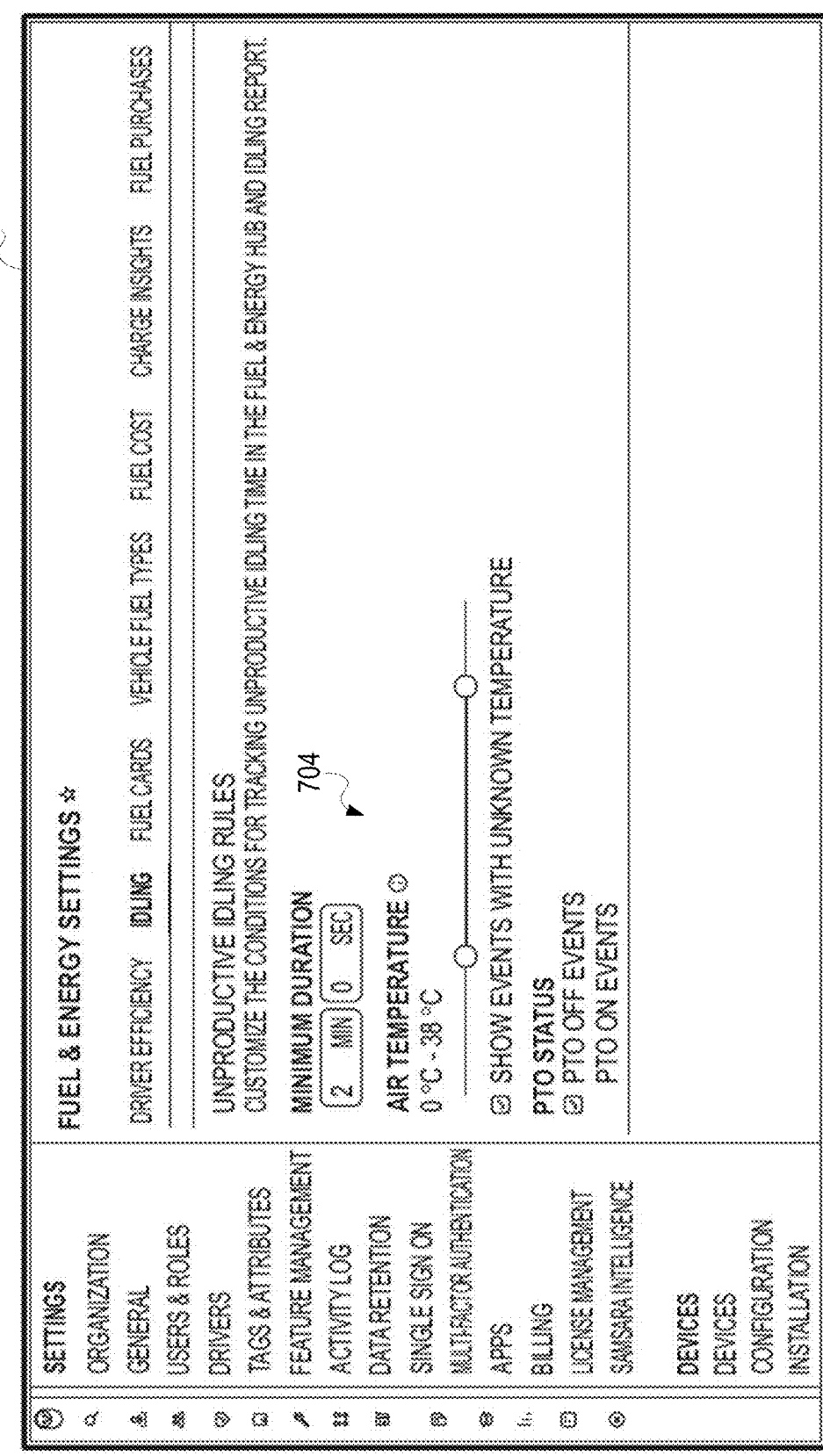
FIG. 7 is an interface diagram depicting a settings interface for configuring idle monitoring parameters and rules, according to certain examples.

FIG. 7 is an interface diagram 700 depicting a settings interface 702 for configuring idle monitoring parameters and rules, according to certain examples. The interface provides a set of configuration options 704 that enable users to customize how the system detects and categorizes idling events. For example, within the interface, users can access a "Fuel & Energy Settings" section that contains configuration options 704 for defining unproductive idling rules and thresholds.

The interface includes multiple configuration panels for different aspects of idle monitoring. For example, an "Unproductive Idling Rules" section allows users to customize the conditions for tracking unproductive idling time. Users can set fundamental parameters such as minimum duration thresholds, with options to specify values like "2 min 0 sec" for triggering idle detection. The interface also provides temperature range configuration options, allowing users to define moderate temperature ranges (e.g., 0° C.-38° C.) for evaluating climate control-related idling.

Other configuration options among the set of configuration options 704 within the interface 702 include PTO (Power Take-Off) status settings, enabling users to specify how the system should handle idling events during PTO operation. In some examples, users can toggle options for including or excluding PTO-related events in idling calculations, with separate controls for "PTO Off Events" and "PTO On Events." The interface also includes a checkbox option to "Show events with unknown temperature," providing flexibility in how the system handles incomplete environmental data.

The settings interface integrates with the broader idle monitoring system by providing the configuration framework that guides how the data collection module 202, context analysis module 204, and classification module 206 process and categorize idling events. These customizable settings ensure that the system's idling detection and classification align with specific operational requirements and environmental conditions of different fleet operations.

Figure 8:
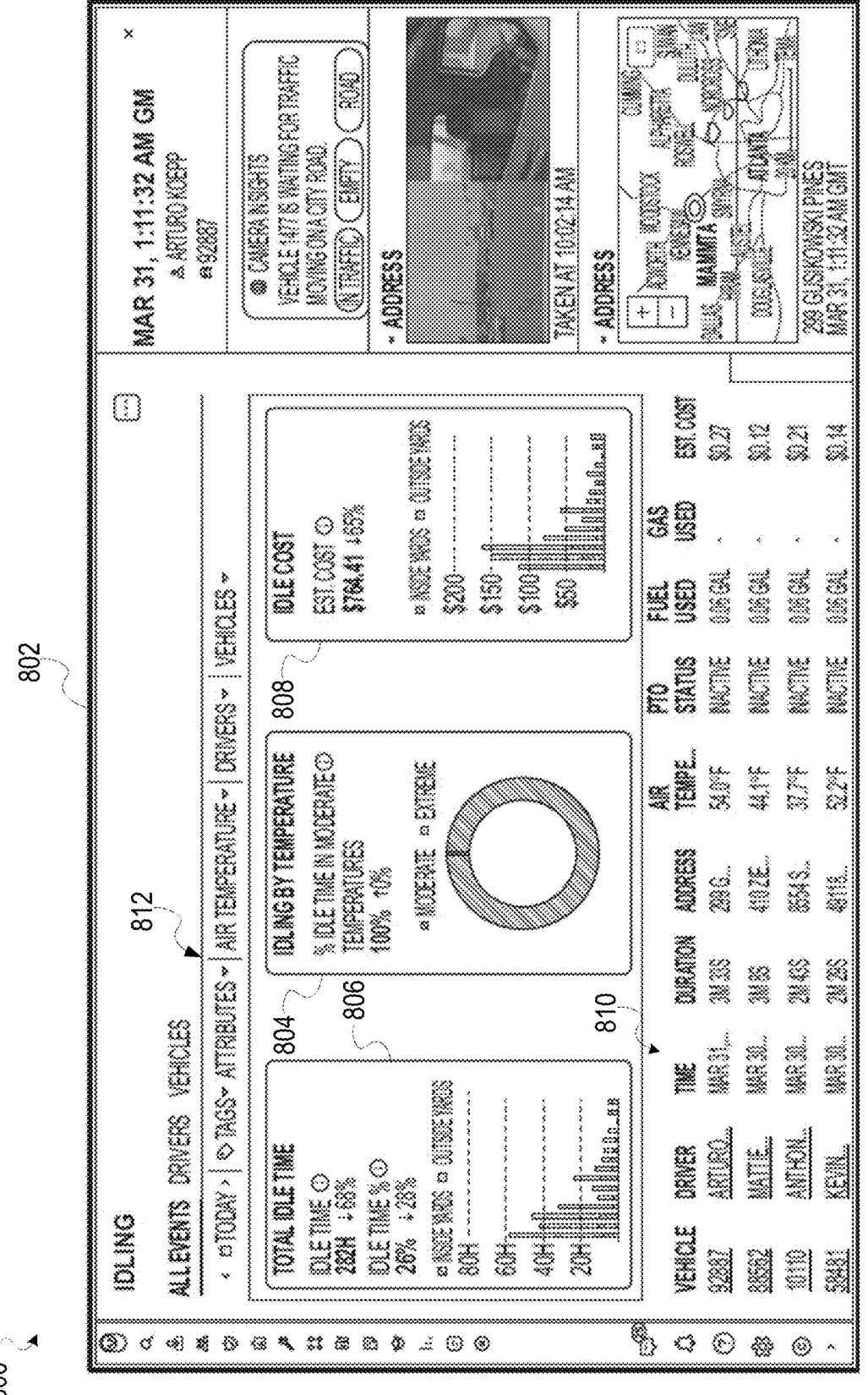
FIG. 8 is an interface diagram depicting a visualization of the idle monitoring dashboard, according to certain examples.

FIG. 8 is an interface diagram 800 depicting a graphical user interface 802 for monitoring and analyzing vehicle idling events. The interface includes a header section with filtering controls 812 that enable users to refine the displayed data through multiple parameters, including date range selectors, tag filters, attribute selectors, air temperature range controls, and dropdown menus for selecting specific vehicles and drivers.

The interface 802 displays performance indicators through visualizations 804, 806, and 808. For example, the "Total Idle Time" visualization 804 presents aggregate idle time measurements of 282 hours and an idle time percentage of 26%, providing high-level insights into fleet idling patterns. The temperature analysis visualization 806 features a pie chart breaking down idling events by temperature ranges, showing the percentage of idling time occurring in moderate versus extreme temperatures, with a 100% indication for moderate temperature idling during the selected period. The cost analysis visualization 808 presents monetary impacts of idling through bar graphs comparing costs between inside yards and outside yards locations.

An event table 810 within the interface 802 provides detailed information about individual idling incidents. For example, the table 810 includes data columns displaying vehicle identifier, driver name, time stamp, duration of idling event, location address, air temperature readings, Power Take-Off (PTO) status, fuel usage metrics, gas usage data, and estimated cost calculations. This granular data presentation enables detailed analysis of specific idling incidents and facilitates the identification of patterns in driver behavior or location-based trends.

Figure 9:
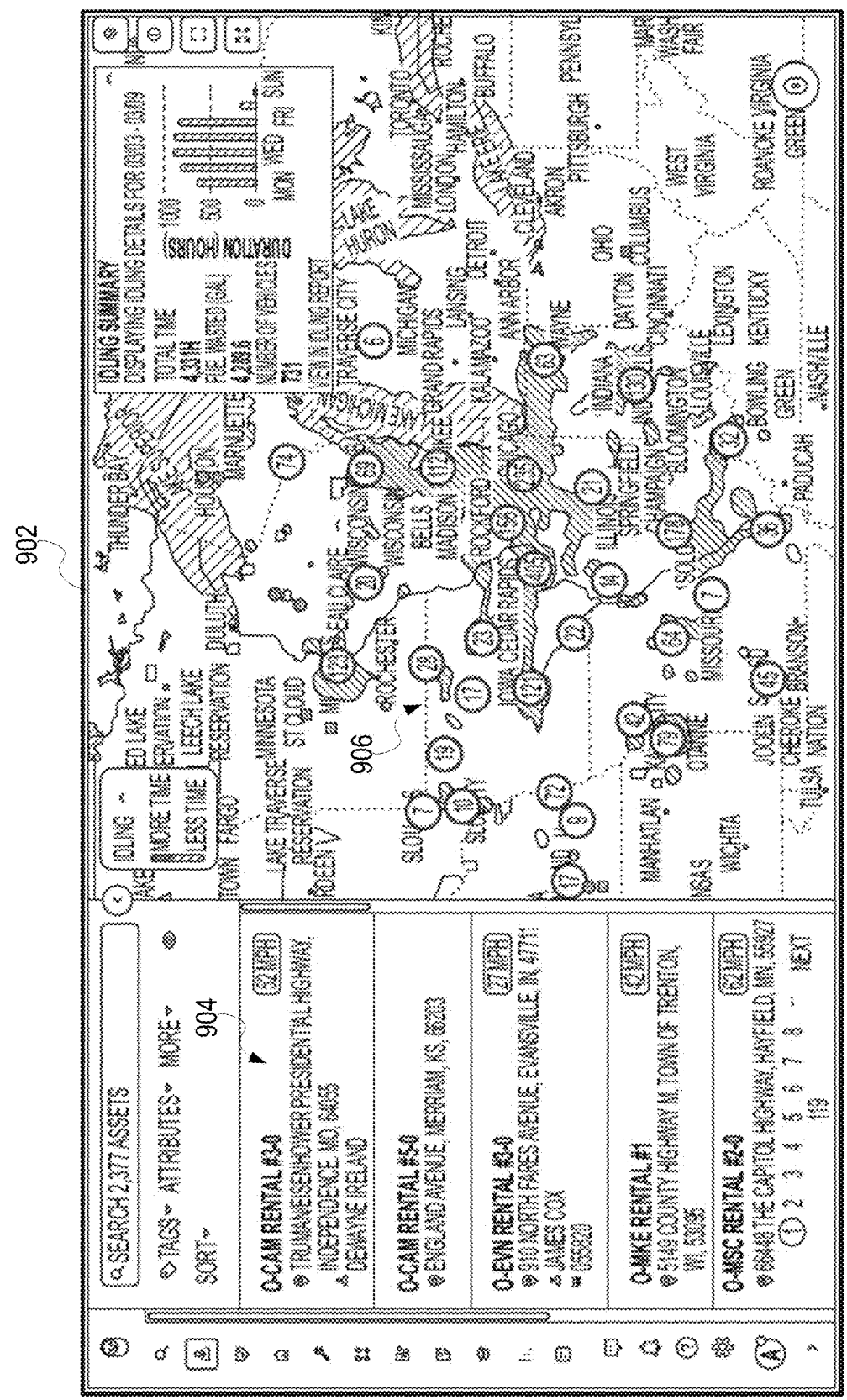
FIG. 9 is an interface diagram depicting a map-based visualization system for monitoring and analyzing vehicle idling events across multiple locations, according to certain examples.

FIG. 9 is an interface diagram 900 depicting a map-based visualization system for monitoring and analyzing vehicle idling events across multiple locations, according to certain examples. The system enables visualization of aggregated idling data through heat map overlays that indicate idling event density across geographical areas.

As seen in the interface diagram 900, the map interface 902 provides an interactive geographical visualization that displays vehicle locations and idling events across different regions. This allows users to track vehicle movements and identify idling patterns across their operational area. The map includes detailed location information and real-time vehicle status updates, such as specific rental vehicles and their current speeds. The map interface 902 supports overlay visualizations that update based on user interaction and selected time periods.

According to certain examples, a summary section 904 presents detailed idling data in a tabular format that in certain examples can be organized by vehicle or driver. For example, when organized by vehicle, it shows individual vehicle idling metrics. When organized by driver, it displays a comprehensive list of all vehicles that the specific driver has operated along with their associated idling metrics. The summary 804 includes a display of performance indicators such as total idling duration, fuel consumption, and estimated costs associated with idling events.

A heatmap visualization 906 overlays aggregated idling data onto the map interface 902 to highlight areas with concentrated idling activity. The heatmap visualization 906 aggregates idling events across multiple locations and assigns visual indicators based on idling event density. This visualization enables fleet operators to quickly identify idling hotspots and investigate specific locations where idling events frequently occur. The heatmap 906 utilizes color intensity to represent the density of idling events, with darker areas indicating higher concentrations of idling activity.

In certain examples, the heatmap visualization 906 processes idling event data using clustering algorithms to efficiently aggregate and display idling patterns. For example, when generating the heatmap visualization 906, the system first clusters nearby idling events, then processes these clusters at different zoom levels to enable efficient visualization of large datasets. For each cluster, the system aggregates metrics like fuel wastage and number of unique devices to provide meaningful insights at different map scales.

Figure 10:
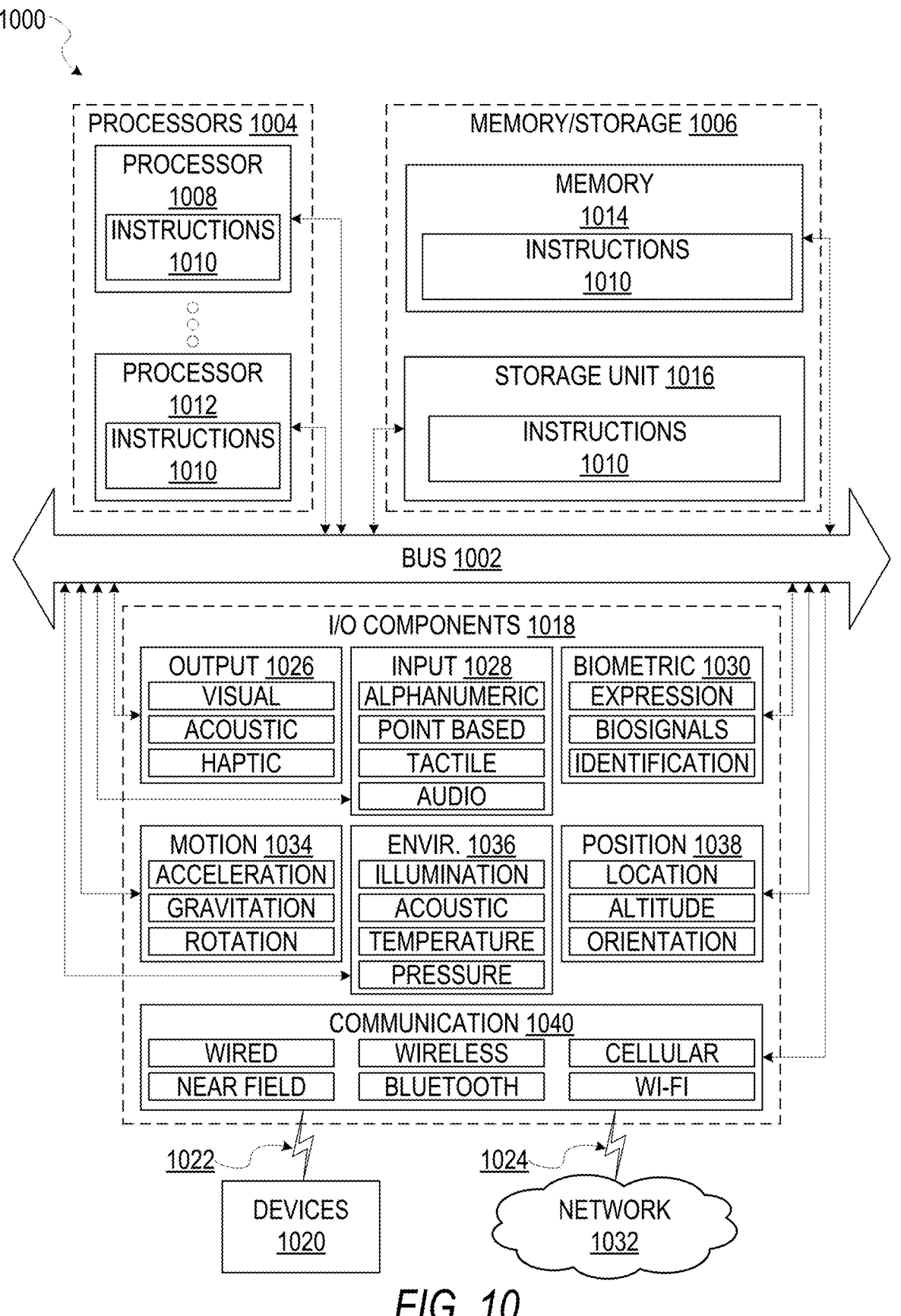
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform the methodologies for idle monitoring and analysis discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform idle monitoring and analysis may be executed. The instructions 1010 transform the general, non-programmed machine 1000 into a particular machine 1000 programmed to collect engine operational data, obtain contextual information, analyze idling events, and generate idling reports. In a networked deployment, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 1010, sequentially or otherwise, that specify actions to be taken by machine 1000.

The machine 1000 includes processors 1004 that execute instructions for the idle monitoring system 124, including the data collection module 202, context analysis module 204, classification module 206, and reporting module 208. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 include components configured to receive engine operational data, camera feeds, and environmental sensor data from vehicle-mounted devices. The specific I/O components 1018 that are included in a particular machine 1000 will depend on the type of machine. For example, portable machines such as mobile phones will likely include a touch input device or other such input mechanisms, while a headless server machine will likely not include such a touch input device. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 are configured to receive engine data, contextual information, and camera feeds for idle monitoring.

The I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include GPS receivers for tracking vehicle locations associated with the sensor data.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)). The communication components support transmission of engine operational data, contextual information, idling alerts, and reports between system components.

The communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth. The components enable real-time monitoring of vehicle idling states, collection of contextual data, and delivery of idling alerts and reports across the vehicle fleet.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), World-wide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:

monitoring engine operational data from a vehicle, the engine operational data indicating a vehicle idling state;

determining that a parameter of the vehicle idling state exceeds a threshold value, the parameter including a duration of the vehicle idling state;

responsive to determining that the parameter of the vehicle idling state exceeds the threshold value, triggering acquisition of contextual data associated with the vehicle, the contextual data including an environmental factor and auxiliary equipment operation status;

analyzing the contextual data to determine an operational condition;

categorizing the vehicle idling state based on the determined operational condition;

generating, based on the categorizing, a report that includes the categorization of the vehicle idling state and the operational condition, the report comprising a visualization that indicates a total idle time value and an idle time percentage for a selected time period; and causing display of the report via a user interface.

2. The method of claim 1, wherein obtaining the contextual data comprises:

capturing image data from at least one camera mounted at the vehicle; and analyzing the image data to determine at least one of:

driver presence in a vehicle cab of the vehicle; and surrounding traffic conditions.

3. The method of claim 1, wherein the engine operational data comprises at least one of:

an engine revolution per minute (RPM) value greater than zero;

a vehicle speed value of zero; and a throttle position value below a threshold percentage.

4. The method of claim 1, wherein obtaining the contextual data comprises:

determining a location of the vehicle; and determining whether the location corresponds to a predefined zone type, wherein the zone type comprises at least one of:

a yard;

a highway; and a city street.

5. The method of claim 1, wherein obtaining the contextual data comprises:

receiving temperature data; and determining whether the temperature data falls within a predefined temperature range.

6. The method of claim 1, wherein categorizing the vehicle idle state comprises:

determining whether the vehicle idling state is productive or unproductive based on customizable rules associated with the operational condition.

7. The method of claim 1, further comprising:

generating an alert based on the categorization of the vehicle idling state; and transmitting the alert to a client device.

8. The method of claim 1, wherein analyzing the contextual data comprises:

processing image data using machine learning to identify environmental conditions affecting the vehicle idling state.

9. The method of claim 1, wherein the report comprises:

a visualization of vehicle idling events categorized by location;

a breakdown of productive versus unproductive idling time; and associated contextual information for each categorized vehicle idling state.

10. The method of claim 1, wherein the report comprises:

aggregating idling events based on location data;

generating a heatmap overlay based on the aggregated idling events; and causing display of the heatmap overlay upon a map interface at a client device.

11. A system comprising:

a memory; and at least one hardware processor to perform operations comprising:

monitoring engine operational data from a vehicle, the engine operational data indicating a vehicle idling state;

determining that a parameter of the vehicle idling state exceeds a threshold value, the parameter including a duration of the vehicle idling state;

responsive to determining that the parameter of the vehicle idling state exceeds the threshold value, triggering acquisition of contextual data associated with the vehicle, the contextual data including an environmental factor and auxiliary equipment operation status;

analyzing the contextual data to determine an operational condition;

categorizing the vehicle idling state based on the determined operational condition;

generating, based on the categorizing, a report that includes the categorization of the vehicle idling state and the operational condition, the report comprising a visualization that indicates a total idle time value and an idle time percentage for a selected time period; and causing display of the report via a user interface.

12. The system of claim 11, wherein obtaining the contextual data comprises:

capturing image data from at least one camera mounted at the vehicle; and analyzing the image data to determine at least one of:

driver presence in a vehicle cab of the vehicle; and surrounding traffic conditions.

13. The system of claim 11, wherein the engine operational data comprises at least one of:

an engine revolution per minute (RPM) value greater than zero;

a vehicle speed value of zero; and a throttle position value below a threshold percentage.

14. The system of claim 11, wherein obtaining the contextual data comprises:

determining a location of the vehicle; and determining whether the location corresponds to a predefined zone type, wherein the zone type comprises at least one of:

a yard;

a highway; and a city street.

15. The system of claim 11, wherein obtaining the contextual data comprises:

receiving temperature data; and determining whether the temperature data falls within a predefined temperature range.

16. The system of claim 11, wherein categorizing the vehicle idling state comprises:

determining whether the vehicle idling state is productive or unproductive based on customizable rules associated with the operational condition.

17. The system of claim 11, further comprising:

generating an alert based on the categorization of the vehicle idling state; and transmitting the alert to a client device.

18. The system of claim 11, wherein analyzing the contextual data comprises:

processing image data using machine learning to identify environmental conditions affecting the vehicle idling state.

19. The system of claim 11, wherein the report comprises:

a visualization of vehicle idling events categorized by location;

a breakdown of productive versus unproductive idling time; and associated contextual information for each categorized vehicle idling state.

20. A non-transitory machine-readable storage medium comprising instructions that, when executed by one or more processors of a machine, cause the machine to perform operations comprising:

monitoring engine operational data from a vehicle, the engine operational data indicating a vehicle idling state;

determining that a parameter of the vehicle idling state exceeds a threshold value, the parameter including a duration of the vehicle idling state;

responsive to determining that the parameter of the vehicle idling state exceeds the threshold value, triggering acquisition of contextual data associated with the vehicle, the contextual data including an environmental factor and auxiliary equipment operation status;

analyzing the contextual data to determine an operational condition;

categorizing the vehicle idling state based on the determined operational condition;

generating, based on the categorizing, a report that includes the categorization of the vehicle idling state and the operational condition, the report comprising a visualization that indicates a total idle time value and an idle time percentage for a selected time period; and causing display of the report via a user interface.

\* \* \* \* \*